United States Patent
O'Reilly (12)

(10) Patent No.: US 6,242,030 B1
(45) Date of Patent: Jun. 5, 2001

(54) *GINKGO BILBOA* FLAVONOID EXTRACT WHICH IS TERPENE-FREE AND HAS A HIGH FLAVONOID HETEROSIDE CONTENT

(75) Inventor: Joseph O'Reilly, County Cork (IE)

(73) Assignee: Societe de Conseils de Recherches et d'Applications Scientifiques (S.C.R.A.S.) (FR)

( * ) Notice: Subject to any disclaimer, the term of this patent is extended or adjusted under 35 U.S.C. 154(b) by 0 days.

(21) Appl. No.: 08/945,565

(22) PCT Filed: Apr. 29, 1996

(86) PCT No.: PCT/FR96/00653

§ 371 Date: Nov. 5, 1997

§ 102(e) Date: Nov. 5, 1997

(87) PCT Pub. No.: WO96/33728

PCT Pub. Date: Oct. 31, 1996

(30) Foreign Application Priority Data

Apr. 27, 1995 (GB) .................................................. 9508533

(51) Int. Cl.[7] ..................................................... A23L 1/22
(52) U.S. Cl. .............................. 426/534; 426/3; 426/583; 426/590; 426/650
(58) Field of Search .................................. 426/583, 534, 426/650, 542, 580, 590, 3

(56) References Cited

U.S. PATENT DOCUMENTS 5,389,370 * 2/1995 O'Reilly et al. .................. 424/195.1

FOREIGN PATENT DOCUMENTS

| 0360556 | 3/1990 | (EP) . |
| 0431536 | 6/1991 | (EP) . |
| 0436129 | 7/1991 | (EP) . |
| 0543051 | 5/1993 | (EP) . |
| 0577143 | 1/1994 | (EP) . |
| 2007352 | 1/1970 | (FR) . |

OTHER PUBLICATIONS

Food Technology, vol. 49, (9/95) No. 9, pp. 64/65, 68–70, 72 Class B04, AN 87–294414, XP002011384 & JP A 62 205 018 (DAICEL) Sep. 9, 1987.

Database WPI, SEc. Ch, Week 9602, Derwent Publ. Ltd., London GB Class B03, AN 96–018388, XP 002011385 & KR,B,9,402,796, 2/94 Sun Kyong.

* cited by examiner

*Primary Examiner*—Leslie Wong
(74) *Attorney, Agent, or Firm*—Bierman, Muserlian and Lucas

(57) ABSTRACT

The invention concerns a *Ginkgo biloba* leaf flavonoid extract and more specifically an extract which is terpene free and/or has a high flavonoid heteroside content. The invention also concerns a flavoring compound containing such an extract and the use of this extract as a flavoring ingredient. The invention finally concerns a process for obtaining a substantially terpene-free *Ginkgo biloba* leaf flavonoid extract.

15 Claims, No Drawings

GINKGO BILBOA FLAVONOID EXTRACT WHICH IS TERPENE-FREE AND HAS A HIGH FLAVONOID HETEROSIDE CONTENT

This application is a 371 of PCT/FR96/00653 filed Apr. 29, 1996.

The invention concerns a flavonoid extract of *Ginkgo biloba* and more specifically an extract either substantially free of terpenes or with a high content of flavonoid heterosides, or free of terpenes and with a high content of flavonoid heterosides. This extract may advantageously be used as a flavoring agent. The invention likewise concerns a flavoring composition comprising such an extract and the use of this extract as a flavoring ingredient.

Applications of extracts of *Ginkgo biloba* in the field of medicine and cosmetics are well known. The extract EGb-761 is perhaps the best known in the medical field (The extract of *Ginkgo biloba* [EGb-761], La Press Médicale, 1986, Vol. 31, Special Number, Masson Publishing Co.). This extract primarily includes two families of substances: the flavonoid and terpene substances. New extracts were defined which, in an unexpected way, modify the organoleptic [sensory] properties of certain foods such as drinks, dairy products, [and] sweets.

One of the aspects of the present invention therefore has as its object extracts which do not comprise any or only a small quantity of terpenes (ginkgolides and bilobalides) which have a high degree of therapeutic activity. Moreover, it has been found to be of interest to obtain extracts enriched with flavonoid substances: these are essentially the mono-, di-, and tri-glucosides of Kaempferol, of Quercetine, and of Isorhamnetine with glucose and with rhamnose.

The invention also has as its object a flavonoid extract of *Ginkgo biloba* leaves free of terpenes. This means that the extract comprises flavonoid heterosides and small quantities of terpenes or no terpenes. If the extract comprises terpenes, the terpene content is a maximum of 1%, preferably a maximum of 0.5%.

The invention likewise has as its object a flavonoid extract with a high flavonoid heteroside content. This means that the extract comprises from 28 to 35% flavonoid heterosides, and preferably 28 to 32%. Such extracts are obtained preferably from the cut leaves of young *Ginkgo biloba* trees.

The invention likewise has as its object a flavonoid extract free of terpenes and with a high content of flavonoid heterosides. This means that the extract is free of terpenes and comprises from 28 to 35% flavonoid heterosides, preferably from 28 to 32%.

More especially, the invention has as its object a flavonoid extract comprising maximally 1% terpenes and from 28 to 25% flavonoid heterosides. Preferably the extract comprises maximally 0.5% terpenes and from 28 to 32% flavonoid heterosides.

A flavonoid extract with a high content of flavonoid heterosides may be obtained by extraction under partial vacuum with an acetone-water mixture. After stages of delipidation, elimination of undesirable substances with various solvents and by precipitation, the extract solution is concentrated and the extract is dried in vacuo.

The invention likewise has as its object a procedure for preparing an extract free of terpenes as defined above. This procedure includes several extraction stages of extract of *Ginkgo biloba* leaves with solvents, characterized in that one of the extraction stages is a deterpenation stage and the solvent used is a compound of formula RC(O)OR' in which R and R' represent independently a lower alkyl alone or mixed with a saturated aliphatic hydrocarbon comprises at least 5 carbon atoms. The extraction stage may be effected at any stage of the process. The solvent used during the determination stage comprises preferably from 0 to 20% saturated aliphatic compound.

Extraction stages other than the deterpenation stage are known in the literature, especially in Patents EP 431535, EP 431536, EP 360556, and EP 324197. These patents are incorporated by reference into the present application.

In the above-indicated definitions, the term lower alkyl represents preferably a linear or branched alkyl radical having from 1 to 6 carbon atoms and in particular an alkyl radical having from 1 to 4 carbon atoms such as the methyl, ethyl, propyl, isopropyl, butyl, isobutyl, sec-butyl, and tert-butyl radicals. Solvents of formula RC(O)OR' in which the R and R' radicals represent methyl, ethyl, or propyl, and especially ethyl acetate, are preferably used.

The saturated aliphatic hydrocarbon may be chosen from among hexane, heptane, [or] octane. Heptane is preferably used.

The invention likewise has as its object a procedure for preparing an extract enriched with flavonoid heterosides as defined above. This procedure includes several stages of extraction from the leaves of *Ginkgo biloba* with solvents, characterized in that one of the extraction stages is a stage of enrichment with flavonoid heterosides and that the solvent used, in a minimum quantity, is an alcohol, alone or mixed with a ketone, preferably acetone. The extraction stage may be carried out at any stage of the procedure. The alcohol used is preferably a lower alcohol such as methanol, ethanol, propanol, [or] butanol, and preferably butanol. The amount of solvent used may be from 3 to 12 parts, and preferably in the lower portion of this range.

An example is described below in the experimental part; the order of the extraction stages with the ethyl acetate/heptane mixture and the acetone-butanol mixture may be reversed.

An extract according to the invention simultaneously modifies the olfactory profile and the taste profile of the product tested. By way of its organoleptic properties, this extract may be used for the preparation of aromatic compositions of various types. It may be used alone or in association with other flavoring ingredients currently used. Thus, the use of such a flavonoid extract is anticipated in food products. As food products, one may cite dairy products such as for example yogurts, refreshing or nutritious drinks, and more especially refreshing drinks without alcohol such as orange drinks or tonics based on quinine, but likewise sweetened products such as for example chewing gum.

The amount used in a flavoring composition or a flavored product may vary over a wide range of values: it is understood that this value depends on the product into which the flavor or the flavoring composition is incorporated, but also on the nature and amount of other constituents of the flavoring composition and upon the desired effect.

The flavonoid extract according to the invention is used in concentrations ranging from 0.001 to 0.1% by weight relative to the total weight of the flavored product, preferably between 0.001 and 0.05%. In the case of dairy products, the flavonoid extract concentration may range from 0.005 to 0.045%. In the case of products such as chewing gums, the flavonoid extract concentration may range from 0.01 to 0.04%. In the case of food products such as refreshing or nutritious drinks, the flavonoid extract concentration may range from 0.002 to 0.02%.

The following examples are presented to illustrate the invention and are not in any case to be considered as limiting the scope of the invention.

EXAMPLE 1

Procedure for Obtaining a Flavonoid Extract

The leaves of *Ginkgo biloba* are extracted with 6 to 12 parts (preferably 8) of water comprising 60% acetone at 50–60 degrees C. and the solution is concentrated so as to reduce the percentage of acetone to less than 3%. This solution is cooled and the lipids are eliminated by decantation. The aqueous solution is extracted with 2 to 5 parts of ethyl acetate comprising 0 to 20% heptane. The resulting solution is extracted with a minimum amount of an acetone-butanol mixture (0 to 15% acetone) in the presence of ammonium sulfate. The organic phase is concentrated; after adding ethanol, the solution is again concentrated. After a new dilution with ethanol, the solution is cooled and the insoluble precipitates are filtered out. The resulting solution is concentrated, dried, and finally pulverized to recover the flavonoid extract in the form of a homogeneous powder.

EXAMPLE 2

Sensory Analysis

A sensory analysis of a flavonoid extract as obtained in Example 1 was carried out for a certain number of food products (dairy products, refreshing drinks, and chewing gums) with or without flavonoid extract.

Sixty tasters participated in this analysis. For each sensory item (acidity, bitterness, sweetness, saltiness) each taster indicated an intensity grade from 0 to 5 corresponding to an increasing degree of evaluation of the product tested.

EXAMPLE 2a

Dairy Products

| Q | Conventional solid yogurt | | | Light solid & yogurt | | |
|---|---|---|---|---|---|---|
| (mg/pot) | 0 | 10 | 25 | 0 | 10 | 25 |
| Acidity | 4 | 3 | 2.5 | 3 | 2.5 | 3 |
| Bitterness | 2.5 | 2.5 | 2.5 | 2 | 2.5 | 1.5 |
| Sweetness | 1 | 2.5 | 2 | 2.5 | 2 | 2.5 |
| Saltiness | 1 | 1.5 | 2 | 3 | 2 | 2 |

Q = amount of extract

| Q | Conventional solid yogurt | | | Light solid & yogurt | | |
|---|---|---|---|---|---|---|
| (mg/pot) | 0 | 10 | 25 | 0 | 10 | 25 |
| Acidity | 4 | 3 | 2.5 | 2 | 2.5 | 2 |
| Bitterness | 2 | 2 | 2.5 | 2 | 2.5 | 2 |
| Sweetness | 2 | 2.5 | 2 | 4 | 3 | 2 |
| Saltiness | 2 | 2.5 | 2 | 2 | 2.5 | 2 |

| Q | Sweetened natural drinking yogurt | | |
|---|---|---|---|
| (mg/l) | 0 | 50 | 100 |
| Acidity | 3 | 3.5 | 3 |
| Bitterness | 1 | 1.5 | 1.5 |
| Sweetness | 3.5 | 3 | 3 |
| Saltiness | 1 | 1 | 1 |

The natural astringency of the extract balances well the fundamental flavors of dairy products by attenuating the acidity of traditional products. The extract appeared to be very complementary with the dairy and fruit characters.

EXAMPLE 2b

Refreshing Drinks

| Q | Quinine-based tonic drink | | | Orange drink | | |
|---|---|---|---|---|---|---|
| (mg/l) | 0 | 50 | 100 | 0 | 50 | 100 |
| Acidity | 2 | 2.5 | 3 | 2.5 | 3 | 3.5 |
| Bitterness | 3 | 2.5 | 3 | 2 | 3.5 | 4 |
| Sweetness | 2.5 | 2.5 | 3.5 | 3.5 | 2.5 | 4 |
| Saltiness | 0.5 | 0.5 | 0.5 | 2 | 1 | 1 |

The astringency of the extract is harmoniously blended with that of the drinks, and more especially with that of quinine grade drinks and/or bitter barks such as Indian Tonic®.

EXAMPLE 2

Chewing Gums

| | Mentholated chewing gum | | | Chlorophyll chewing gum | | | Other mentholated chewing gum | | |
|---|---|---|---|---|---|---|---|---|---|
| U (mg/unit) | 0 | 3 | 6 | 0 | 6 | 12 | 0 | 3 | 6 |
| Freshness | 4 | 2 | 1 | 2 | 3 | 1 | 2 | 3 | 1 |
| Tartness | 4 | 3 | 1 | 2 | 2 | 1 | 2 | 2 | 1 |
| Sweetness | 3 | 3.5 | 4 | 2 | 3 | 4 | 3 | 4 | 4 |
| Herbal flavor | 0 | 2 | 4 | 2 | 3 | 4 | 1 | 2 | 4 |

U = unit

EXAMPLE 3

Descriptive Test

This test was conducted with several varieties of yogurts. Sixty tasters, consumers of natural yogurts, participated in the test. The method used was a comparative test of sensory profiles. The questionnaire contained 9 to 10 descriptive items according to the "solid" or "mixed" variety tested. Each taster indicated on a 10 cm nonstructured scale for each item the perceived intensity and this was carried out successively for all of the products. The results obtained are the following:

EXAMPLE 3a

Product Tested: Solid Yogurts 0% of Fatty Matter, with or without the Addition of 0.04% of a Flavonoid Extract as Obtained in Example 1.

|  | Variety with extract | | Variety without extract | | | |
| --- | --- | --- | --- | --- | --- | --- |
| Descriptor | Average | Standard deviation | Average | Standard deviation | t | S |
| Firmness | 6.68 | 1.35 | 6.58 | 1.52 | 0.81 | |
| Overall intensity of aroma | 5.00 | 1.72 | 4.77 | 1.72 | 1.42 | |
| Smooth consistency in the mouth | 6.54 | 2.03 | 6.34 | 1.79 | 1.18 | |
| Denseness | 4.90 | 1.54 | 4.73 | 1.73 | 0.97 | |
| Fatty sensation in the mouth | 2.31 | 1.98 | 2.04 | 1.91 | 1.95 | |
| Fruity taste | 2.65 | 2.10 | 0.70 | 1.02 | 8.36 | 1% |
| Fermented taste | 2.99 | 2.33 | 3.22 | 2.13 | 1.28 | |
| Acid taste | 2.74 | 2.07 | 2.67 | 1.98 | 0.33 | |
| Bitter taste | 2.07 | 1.82 | 1.42 | 1.31 | 3.95 | 1% | t = Student's "T" on paired series; S = degree of significance

The variety with the flavonoid extract is distinguished in a highly significant way as having a more pronounced fruity taste and a more intensely bitter taste than the variety without flavonoid extract.

EXAMPLE 3b

Product Tested: Fatty Solid Yogurts, with or without the Addition of 0.04% Flavonoid Extract as Obtained in Example 1.

|  | Variety with extract | | Variety without extract | | | |
| --- | --- | --- | --- | --- | --- | --- |
| Descriptor | Average | Standard deviation | Average | Standard deviation | t | S |
| Firmness | 7.65 | 1.60 | 7.38 | 1.36 | 2.06 | 5% |
| Overall intensity of aroma | 4.85 | 1.85 | 4.81 | 1.92 | 0.27 | |
| Smooth consistency in mouth | 7.01 | 1.99 | 6.87 | 2.12 | 0.92 | |
| Denseness | 6.26 | 2.05 | 5.46 | 1.91 | 4.92 | 1% |
| Fatty sensation in mouth | 4.17 | 2.08 | 3.54 | 1.95 | 3.59 | 1% |
| Fruity taste | 2.25 | 1.99 | 0.84 | 1.19 | 6.04 | 1% |
| Fermented taste | 2.62 | 2.06 | 2.66 | 2.19 | 0.24 | |
| Add taste | 2.62 | 1.72 | 2.61 | 1.59 | 0.05 | |
| Bitter taste | 1.69 | 1.55 | 1.53 | 1.49 | 0.88 | | t = Student's "T" in paired series; S = Significance

The variety with the flavonoid extract is distinguished in a highly significant way as having a denser consistency in the mouth, a more intense sensation of fat in the mouth, and a more pronounced fruity taste and, in a significant way, as having a firmer consistency on the spoon than the variety without flavonoid extract.

EXAMPLE 3c

Product Tested: Fat Mixed Yogurts with or without the Addition of 0.04% Flavonoid Extract as Obtained in Example 1.

|  | Variety with extract | | Variety without extract | | | |
| --- | --- | --- | --- | --- | --- | --- |
| Descriptor | Average | Standard deviation | Average | Standard deviation | t | S |
| Denseness on spoon | 5.29 | 1.71 | 5.22 | 1.71 | 0.56 | |
| Ropy consistency on the spoon | 3.52 | 1.91 | 3.50 | 1.80 | 0.20 | |
| Overall intensity of aroma | 4.36 | 1.69 | 4.32 | 1.68 | 0.27 | |
| Smooth sensation in mouth | 8.23 | 1.48 | 8.17 | 1.63 | 0.66 | |
| Denseness | 3.99 | 1.96 | 4.06 | 2.04 | 0.45 | |
| Fatty sensation in mouth | 3.72 | 2.01 | 3.42 | 1.82 | 1.77 | |
| Fruity taste | 2.60 | 1.92 | 1.09 | 1.31 | 5.97 | 1% |
| Fermented taste | 3.19 | 2.20 | 2.94 | 2.27 | 1.11 | |
| Acid taste | 3.10 | 2.00 | 2.47 | 1.71 | 2.63 | 5% |
| Bitter taste | 2.00 | 1.78 | 1.53 | 1.57 | 2.35 | 5% | t = Student's "T" in paired series; S = Significance

The variety with the flavonoid extract is distinguished in a highly significant way as having a more pronounced fruity taste and, in a significant way, as having a more acidic taste and a more bitter taste than the variety without flavonoid extract.

What is claimed is:

1. A flavonoid extract from the leaves of the *Ginkgo biloba*, containing at most 1% of terpenes and 28 to 35% by weight of flavonoid heterosides.

2. An extract as defined in claim 1, comprising less than 0.5% terpenes.

3. An extract as defined in claim 1, comprising from 28 to 32% flavonoid heterosides.

4. A process for preparing an extract as defined in claim 1, comprising extracting several times the leaves of the *Ginkgo biloba* with solvents, wherein one of the extraction stages is a deterpenation stage using a solvent of formula RC(O)OR' in which R and R' are individually lower alkyl, alone or mixed with a saturated aliphatic hydrocarbon of 1 to 5 carbon atoms.

5. The process of claim 4, wherein the solvent used for the deterpenation stage is selected from the group consisting of methyl, ethyl, and propyl acetate, and comprises 0 to 20% saturated aliphatic hydrocarbon.

6. A flavoring composition comprising as flavoring ingredient an extract according to claim 1 alone or in association with other flavors.

7. A product flavored with a composition according to claim 6.

8. A product according to claim 7 which is a dairy product.

9. A product according to claim 7 which is a drink.

10. A product according to claim 7 which is a sweetened product.

11. A food product containing the flavonoid extract of claim 1 as a food flavoring.

12. A yogurt containing the flavonoid extract of claim 1 to provide a pronounced fruity flavor and a firmer consistency.

13. A nutritious non-alcoholic drink containing the flavonoid extract of claim 1 as a flavoring agent.

14. A product of claim 8 where the dairy product is yogurt.

15. A product of claim 10 which is chewing gum.

* * * * *